(12) United States Patent
Finlay et al.

(10) Patent No.: US 10,318,484 B2
(45) Date of Patent: Jun. 11, 2019

(54) SCAN OPTIMIZATION USING BLOOM FILTER SYNOPSIS

(71) Applicant: International Business Machines Corporation, Armonk, NY (US)

(72) Inventors: Ian R. Finlay, Uxbridge (CA); Jeffrey M. Keller, Cambridge, MA (US); Adam J. Storm, Toronto (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 14/947,506

(22) Filed: Nov. 20, 2015

(65) Prior Publication Data
US 2016/0188623 A1      Jun. 30, 2016

(30) Foreign Application Priority Data
Dec. 29, 2014   (CA) .................................... 2876466

(51) Int. Cl.
*G06F 16/174*   (2019.01)
*G06F 16/22*    (2019.01)

(52) U.S. Cl.
CPC ...... *G06F 16/1744* (2019.01); *G06F 16/2255* (2019.01)

(58) Field of Classification Search
CPC ...................... G06F 17/30153; G06F 17/3033
USPC ................................................. 707/602, 690
See application file for complete search history.

(56) References Cited

U.S. PATENT DOCUMENTS

| | | | | |
|---|---|---|---|---|
| 6,438,562 | B1 * | 8/2002 | Gupta | ................. G06F 16/2272 |
| | | | | 707/696 |
| 6,999,967 | B1 * | 2/2006 | Ghazal | ................ G06F 16/2456 |
| 8,301,650 | B1 * | 10/2012 | Oliver | ............... G06F 17/30949 |
| | | | | 707/758 |
| 8,332,367 | B2 | 12/2012 | Bhattacherjee et al. | |
| 8,549,004 | B2 | 10/2013 | Lakshminarayan et al. | |

(Continued)

FOREIGN PATENT DOCUMENTS

| | | |
|---|---|---|
| CA | 2876466 | 12/2014 |
| WO | 2013152678 A1 | 10/2013 |

OTHER PUBLICATIONS

Chang et al., "Bigtable: A Distributed Storage System for Structured Data", To appear in OSDI 2006, Google, Inc., Printed on: Sep. 11, 2015, pp. 1-14.

(Continued)

*Primary Examiner* — Cam Linh T Nguyen
(74) *Attorney, Agent, or Firm* — Andrew Aubert; Maeve Carpenter

(57) ABSTRACT

An illustrative embodiment for optimizing scans using a Bloom filter synopsis, defines metadata to encode distinct values in a range of values associated with a particular portion of a managed object in a database management system into a probabilistic data structure of a Bloom filter that stores an indicator, encoded in a fixed size bit map with one or more bits, indicating whether an element of the particular portion of the managed object is a member of a set of values summarized in the Bloom filter using a value of 1 or definitely not in the set using a value of 0. The Bloom filter is compressed to create a compressed Bloom filter. The Bloom filter is added to the metadata associated with the managed object and used when testing for values associated with predicates.

20 Claims, 10 Drawing Sheets

(56) References Cited

U.S. PATENT DOCUMENTS

| | | | |
|---|---|---|---|
| 8,903,831 B2 | 12/2014 | Lyle | |
| 8,972,337 B1* | 3/2015 | Gupta | G06F 17/30563 707/602 |
| 2003/0005036 A1* | 1/2003 | Mitzenmacher | H04L 67/2852 709/203 |
| 2009/0030786 A1* | 1/2009 | Rosler | G06Q 30/02 705/14.13 |
| 2010/0040066 A1* | 2/2010 | Hao | H04L 45/00 370/395.31 |
| 2010/0040067 A1* | 2/2010 | Hao | H04L 45/00 370/395.32 |
| 2010/0082648 A1 | 4/2010 | Potapov et al. | |
| 2011/0258225 A1 | 10/2011 | Taylor et al. | |
| 2012/0179877 A1* | 7/2012 | Shriraman | G06F 9/524 711/141 |
| 2012/0303627 A1 | 11/2012 | Keeton et al. | |
| 2013/0132408 A1 | 5/2013 | Little | |
| 2013/0260813 A1* | 10/2013 | Agerstam | H04W 48/08 455/517 |
| 2014/0136762 A1* | 5/2014 | Li | G06F 12/0246 711/103 |
| 2015/0058356 A1 | 2/2015 | Lyle | |
| 2015/0088813 A1* | 3/2015 | Lahiri | G06F 17/30292 707/609 |
| 2015/0161194 A1* | 6/2015 | Provenzano | G06F 17/30371 707/690 |

OTHER PUBLICATIONS

Judd, "Nuggetwheat/hypertable-website", GitHub, Nov. 15, 2010, 13 pages, <https://github.com/nuggetwheat/hypertable-website/blob/master/org/hql/create-table.html>.

Michael et al., "Improving distributed join efficiency with extended bloom filter operations", 21st International Conference on Advanced Networking and Applications(AINA'07), © 2007, IEEE, Printed on: Sep. 11, 2015, 8 pages.

Raman et al., "DB2 with BLU Acceleration: So Much More than Just a Column Store", Proceedings of the VLDB Endowment, vol. 6, No. 11, Copyright 2013 VLDB Endowment, Printed on: Sep. 11, 2015, 12 pages.

"Bloom filter", From Wikipedia, the free encyclopedia, Oct. 15, 2015, 15 pages, <http://en.wikipedia.org/wiki/Bloom_filter>.

"BloomFilters: Design Overview for BloomFilters", Hypertable, Updated: Feb. 4, 2010, 2 pages, <https://code.google.com/p/hypertable/wiki/BloomFilters>.

"HQL Reference", Hypertable, Printed on: Sep. 11, 2015, 32 pages, <http://hypertable.com/documentation/reference_manual/hql/#create-table>.

* cited by examiner

SCAN OPTIMIZATION USING BLOOM FILTER SYNOPSIS

BACKGROUND

This disclosure relates generally to database management systems in a data processing system and more specifically to granularity of information represented in metadata stored in a managed object of the database management system of the data processing system.

A typical problem in database environments is a request to find elements of a long list of values that match a given value, or that belong to a given set of values. A brute force approach typically involves scanning the whole list, but that is often inefficient. In some situations, an index is created and/or a sort of the values is performed and then a query is performed more efficiently, but often that is infeasible due to the overhead of generating and maintaining the index or sorted elements, or due to constraints on how the data is stored.

One existing approach involves partitioning the data into zones and maintaining, for each zone, a modest amount of metadata, which can be used to eliminate many of the zones from consideration, reducing the number of zones that need to be scanned. With the increasing use of synopsis tables, also often referred to as zone maps, to provide metadata describing underlying regions of a table, there is increasing demand on other abilities and use in increasingly wider areas. Zone maps however typically offer limited information on content in the zone or stride. For example, the most commonly tracked metadata is associated with a high value and a low value for the zone, to bracket a range of values present in a particular region of a table. The high value and low value per column in the zone may form a very useful coarse grain filtering when the high/low values are of a limited range, and is typically better than no information at all. These high values and low values are used to determine whether a particular region of the table needs to be accessed, and thus are used conditionally to reduce input/output operations and processing requirements for the processing of a query. Often the level of detail in the zone map is not sufficient to eliminate ranges of a table that do not contain the target column value(s), which causes extra input/output operations, and uses more processor resources to decompress the data.

However a page level rarely has the metadata needed to avoid decompression and/or decryption before predicate application and resulting searching of a list of values is expensive in terms of input/output operations, and processor resources. Further, with use of encryption, compression at a column level, row level and page level, examination of columns on a page to determine whether a particular row qualifies as a predicate is typically very expensive in terms of computing resource.

Other solutions using indexes typically require large amounts of storage and processing resources to maintain. Column stores partly solve this resource usage problem by creating separate copies of all columns by breaking tables vertically enabling predicates to be applied to a single column in the store while not touching other columns not required to respond to the query. Other solutions typically involve applying the predicates to compressed data, or potentially after partial decompression of the data. Conventional use of Bloom filters is evident in previous solutions as well.

SUMMARY

An illustrative embodiment for optimizing scans using a Bloom filter synopsis, defines metadata to encode distinct values in a range of values associated with a particular portion of a managed object in a database management system into a probabilistic data structure of a Bloom filter that stores an indicator, encoded in a fixed size bit map with one or more bits, indicating whether an element of the particular portion of the managed object is a member of a set of values summarized in the Bloom filter using a value of 1 or definitely not in the set using a value of 0. The Bloom filter is compressed to create a compressed Bloom filter. The Bloom filter is added to the metadata associated with the managed object and used when testing for values associated with predicates.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
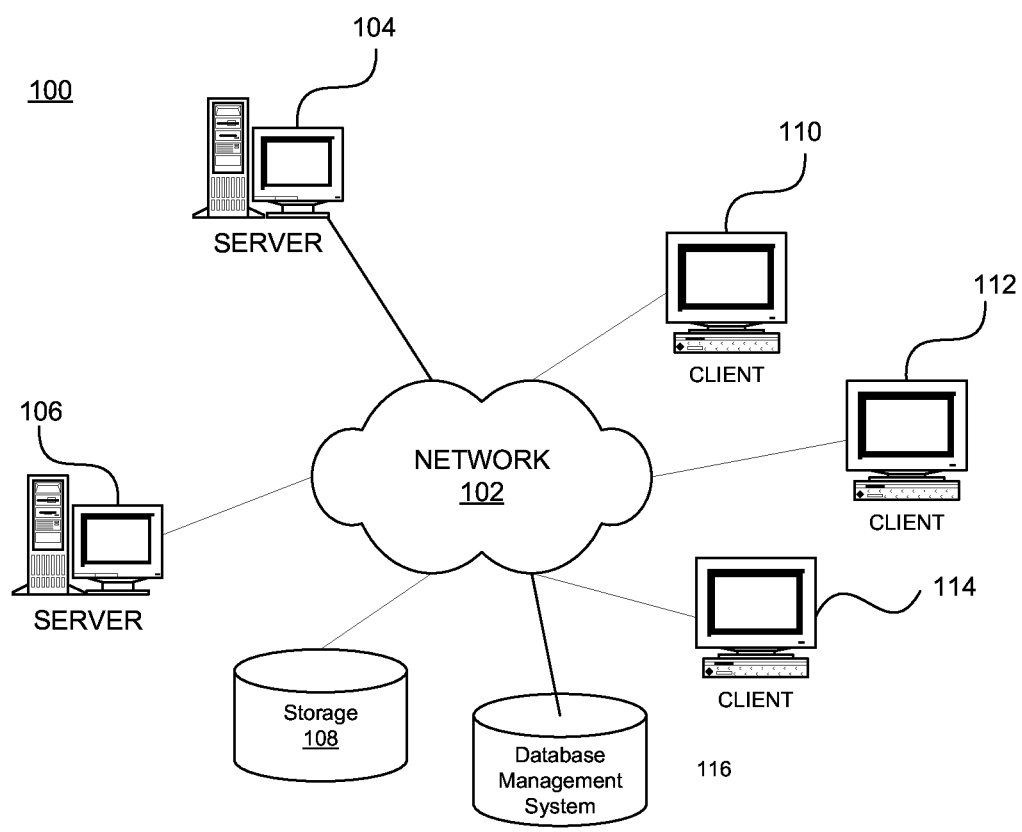
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied in which the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
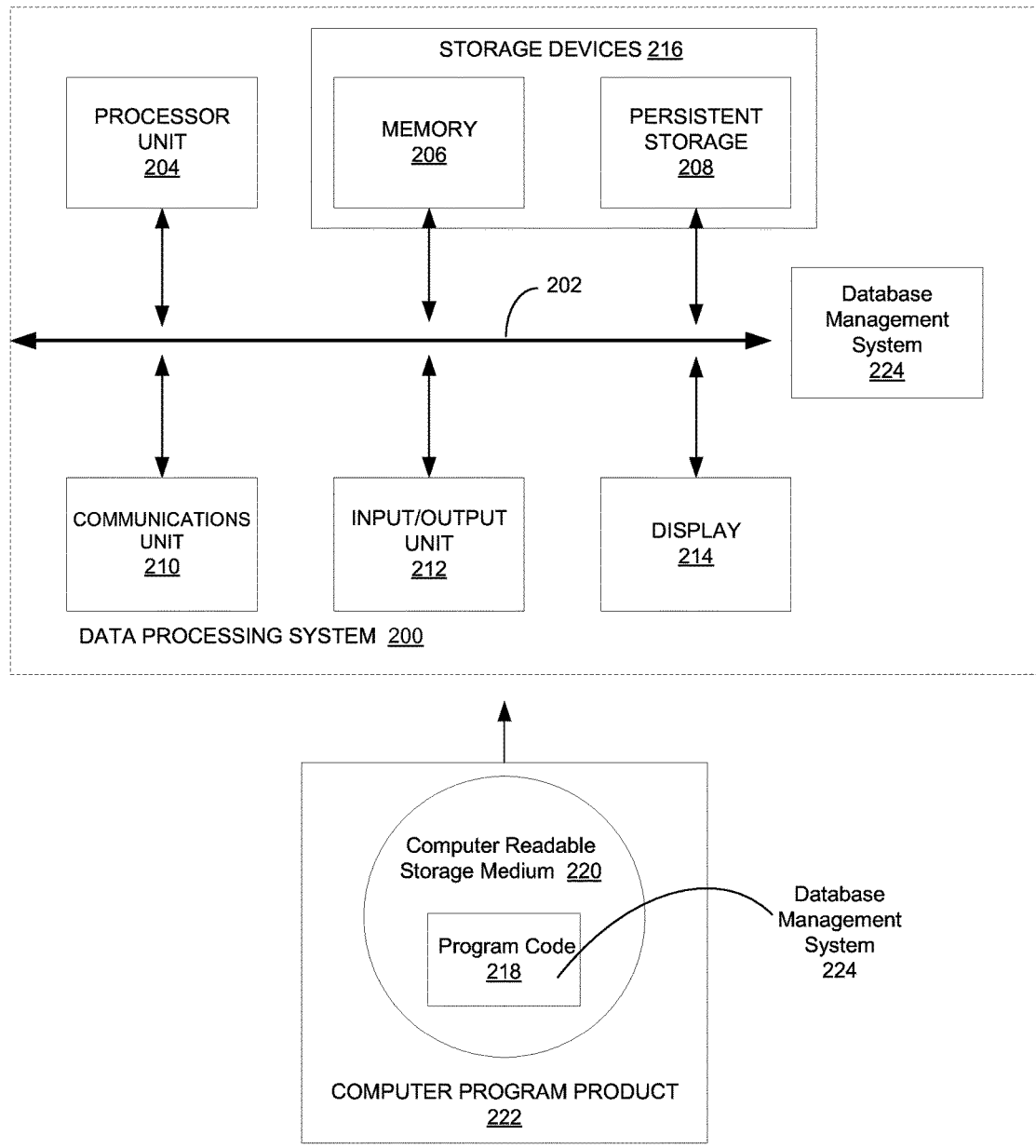
FIG. 2 is a block diagram of an exemplary data processing system operable for various embodiments of the disclosure.

With reference now to the Figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

One or more of server 104 and server 106 include database management system 116. In an alternative instance, database management system 116 may exist as a separate system connected to network 102 in a same manner as storage unit 108.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. Database management system 224 leverages support of memory 206 and persistent storage 208 as examples of storage devices 216, as well as communication, input/output and processor resources of communications unit 210, input/output unit 212 and processor unit 204.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for optimizing scans using a Bloom filter synopsis, is presented. Processor unit 204 defines metadata to encode distinct values in a range of values associated with a particular region of a managed object in a database management system into a probabilistic data structure in memory 206 of a Bloom filter that stores an indicator, encoded in a fixed size bit map with one or more bits, indicating whether an element of the particular region of the managed object is a member of a set of values summarized in the Bloom filter using a value of 1 or definitely not in the set using a value of 0. Processor unit 204 compresses the Bloom filter in memory 206 to create a compressed Bloom filter. Processor unit 204 adds the Bloom filter to the metadata associated with the managed object in one or more of storage devices 216. Processor unit 204 uses the Bloom filter when testing for values associated with predicates.

Figure 3:
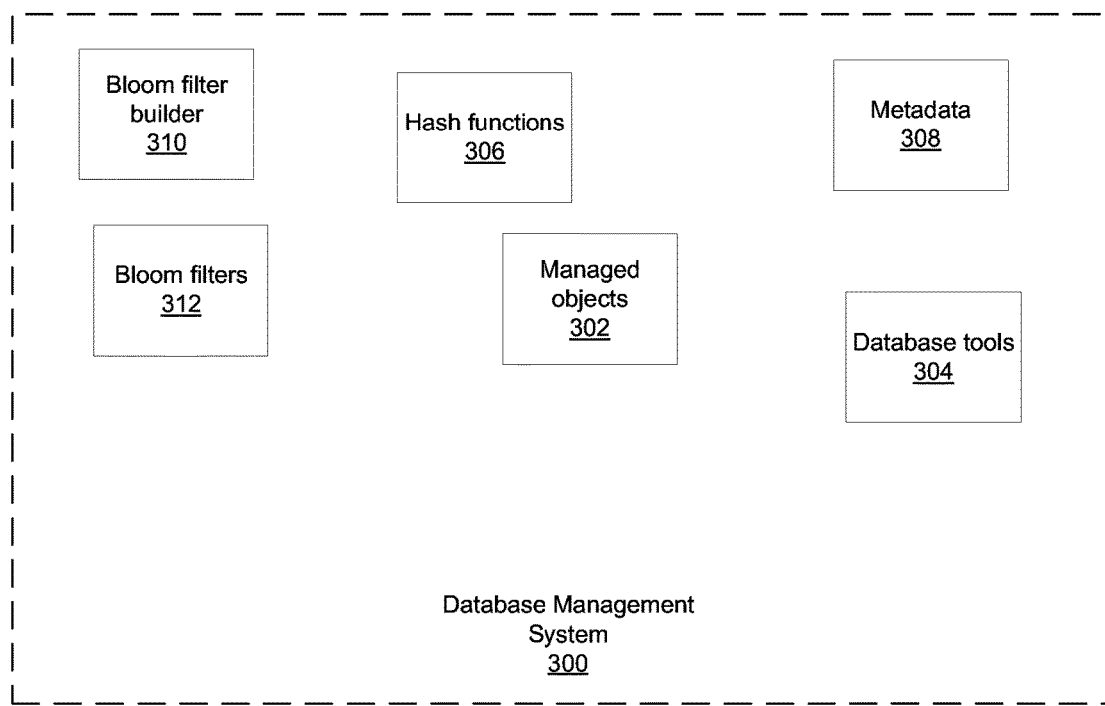
FIG. 3 is a block diagram of a database management system operable for various embodiments of the disclosure.

With reference to FIG. 3 a block diagram of a database management system operable for various embodiments of the disclosure is presented. Database management system 300 is an example of a database management system 116 of FIG. 1 and database management system 224 of FIG. 2 having a capability of creating, managing and utilizing Bloom filters in the disclosed process.

Database management system 300 is enhanced to provide a capability of creating, maintaining and utilizing Bloom filter 312 in conjunction with managed objects. Bloom filter 312 as used also refers to one or more Bloom filters. Managed objects 302 include objects comprising database tables, pages, zone maps and synopsis tables and regions thereof as typically found and used in a database management system. One or more Bloom filters may be associated with a particular managed object depending upon a particular object type. For example, when a hierarchical structure is being used, a Bloom filter for a non-leaf node in the hierarchy represents a union of Bloom filters for the respective children of the non-leaf node. In another example, a Bloom filter may be created and associated with each column of a particular database table. In another example, a Bloom filter may be created and associated with a region of a page of memory representative of a page managed by database management system 300.

Bloom filter 312 is a space-efficient probabilistic data structure used to determine whether an element (used as a search argument) is a member of a particular set of elements associated with the Bloom filter. Bloom filter 312, when initialized, is a bit array of a predetermined length in which all bits are set to 0. Use of Bloom filter 312 may produce a determination that is a false positive retrieval result, but will not produce a false negative. For example, a query returns a result indicating either "inside the set" which may be wrong or "definitely not in set" which is reliably correct. Elements can be added to the set of elements covered by a particular instance of the Bloom filter, however elements cannot be removed because removal can cause unpredictable results on the bit pattern of the Bloom filter. Typically as more elements are added to the set of elements covered by the particular instance of the Bloom filter, the larger the probability of false positives becomes.

Hash functions 306 provides a capability of selecting a hash function from a set of hash functions for use in building each of one or more of Bloom filter 312 and for generating a hash value for an element to be used in a determination whether the element is a member of a particular set of elements associated with the Bloom filter. Bloom filter builder 310 uses hash functions 306 to populate each of the one or more of Bloom filter 312 with hashed values of elements in a set of elements to be associated with the particular Bloom filter 312. Bloom filter builder 310 hashes a specific element to one or more bit array positions of the particular Bloom filter 312. Each of the one or more bit array positions is thus turned on and set to 1 now.

Metadata 308 provides a capability for descriptive information to be associated with a managed object. Database management system 300 is further enhanced to provide a capability of creating, maintaining and utilizing additional metadata in the form of Bloom filter 312 in conjunction with managed objects. For example, existing metadata is enhanced to include an instance of a particular Bloom filter 312 for one of the database tables, pages, zone maps and synopsis tables of database management system 300. The metadata capability is further enhanced to include an instance of a particular Bloom filter 312 for each specified column of one of the database tables.

Database management system 300 further provides a capability of database tools 304 in the form of prefix compression and decompression used in conjunction with sizing of an instance of a particular Bloom filter 312 as well as normal operation usage of the managed objects. The prefix compression support is applied in the process of generating Bloom filter 312 by Bloom filter builder 310 to further reduce a size of a particular Bloom filter.

Figure 4:
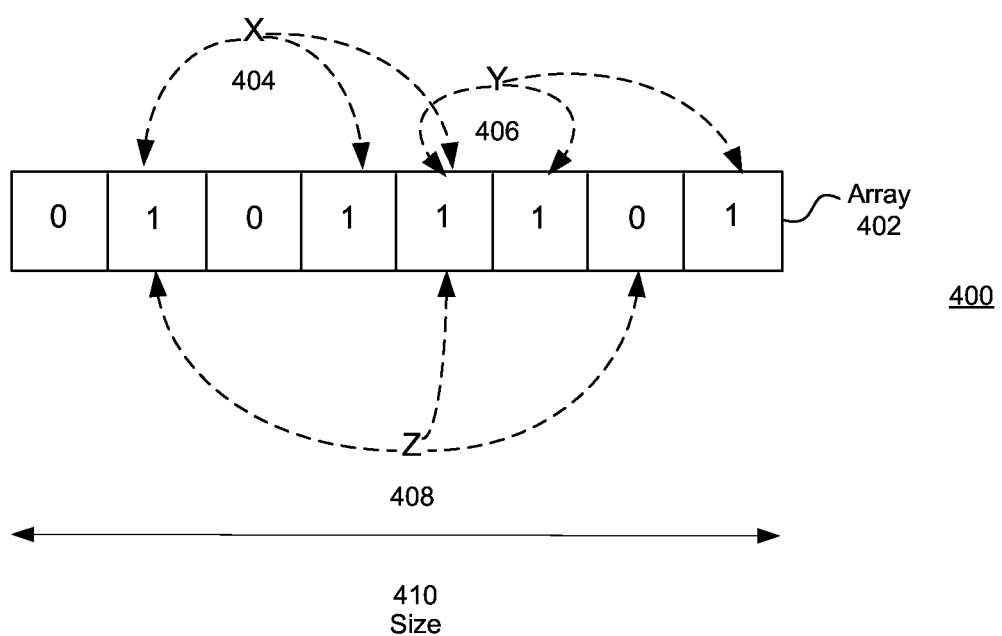
FIG. 4 a block diagram of a Bloom filter operable for various embodiments of the disclosure.

With reference to FIG. 4 a block diagram of a Bloom filter operable for various embodiments of the disclosure is presented. Bloom filter 400 is an example of a Bloom filter 312 of FIG. 3 having a predetermined size.

Array 402 is a bit array, in this example having a size 410 of 8 bits, in which all positions are set to 0 when initialized. One skilled in the art would readily appreciate array 402 may be constructed of other sizes as determined by the data being represented as well as storage capacity and hardware architecture permit. Each different element in a set of elements of data elements x, y, represented as elements 404 and 406 respectively, is processed through a set of different independent hashing functions h to populate h positions in array 402. For example, when h=3, element 404 will be hashed three different times into three different resulting bit positions of array 402. A bit is accordingly set on in each position of array 402 for which an element is mapped into by a selected one of the hashing functions used.

When data element z, element 408 is queried to determine membership in the set of elements including elements 404 and 406, element 408 is also hashed using the set of different independent hashing functions h to populate h positions in array 402. When any bits result in a 0 position then element 408 is definitely not in the set of elements including elements 404 and 406. However when all bits result in a 1 position then element 408 may be in the set or the hashing operation for element 408 or other elements may have generated a false positive.

An embodiment of the invention accordingly maintains, for a particular region or zone of a database table, a Bloom filter of a predetermined size describing elements in the particular region or zone and uses the additional metadata to restrict the potential regions or zones to be scanned for a query. The number of ones in the Bloom filter can also be used to estimate distinct cardinality (i.e. number of distinct values) of a region or zone, which may be useful for other purposes, including selecting an efficient algorithm for performing a given operation.

When the distinct cardinality in a zone is large compared to the size of the Bloom filter, the filter is likely to become saturated, and hence of little value in use. When the zones are further organized into a tree (a hierarchical zone map), then possible saturation and reduction in utility still applies, although higher-level Bloom filters are more likely to become saturated than lower level Bloom filters.

In the following examples, "filter" means a "Bloom filter", and "hash," means a "Bloom hash." Both filters and hashes are assumed to be bit vectors of length m. A hash contains k ones, and thus can be compactly represented in O(k) space. A filter is considered saturated when the filter has a high proportion of ones, which produces a high rate of false positives. Typically a clear threshold for saturation is not defined, but saturation occurs when a number of distinct values represented in the filter become comparable to m/k. Thus, when n=256 and k=4, then the filter can be said to have a capacity of 64 distinct values.

A filter f is said to include a hash h iff f & h==h. A filter f is said to include a filter g iff f & g==g. The union of filters f and g is f|g (the bitwise OR of the two bit vectors), therefore a filter may be considered as a union of hashes. The intersection of filters f and g is f & g.

Figure 5:
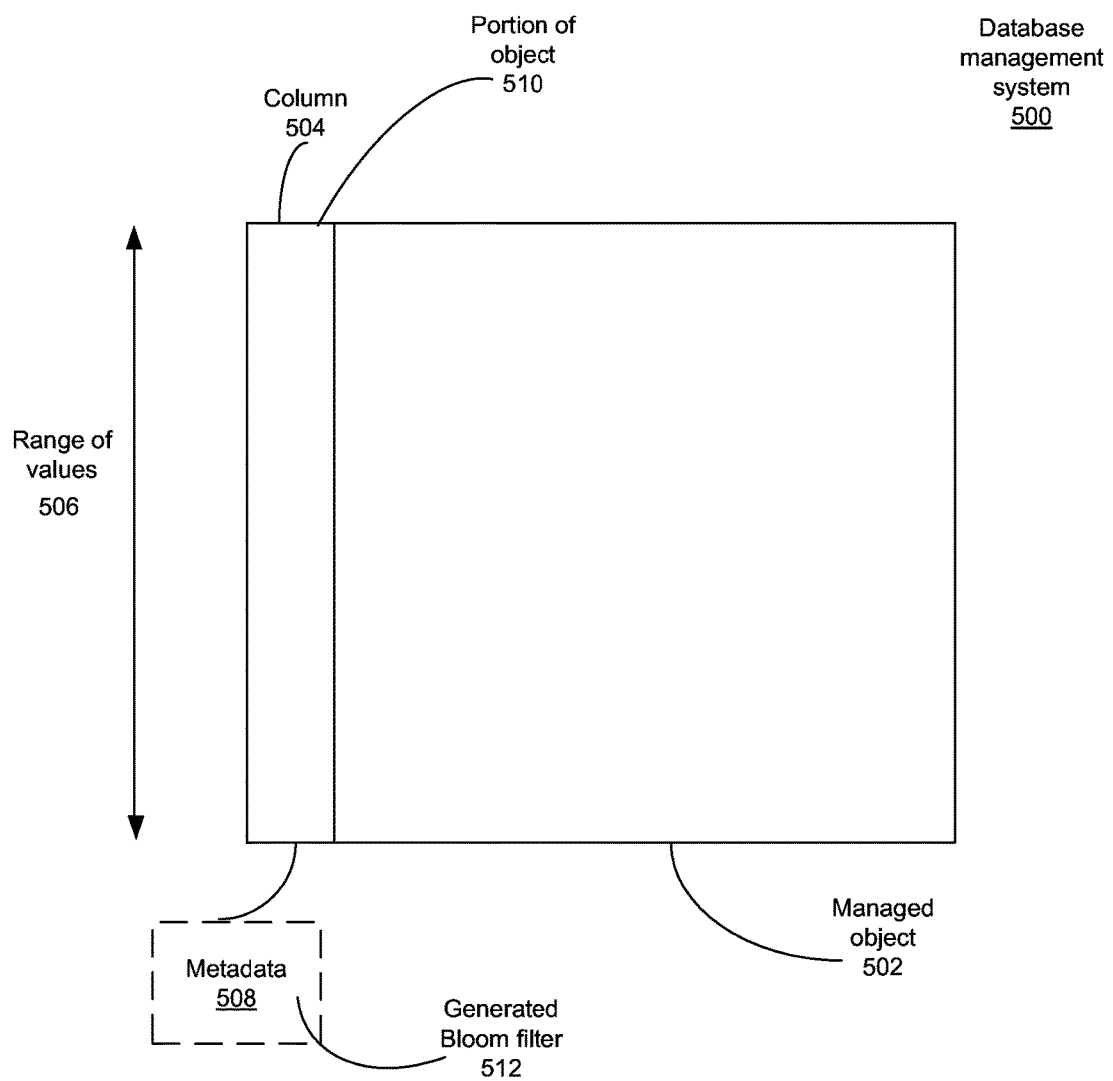
FIG. 5 is a block diagram of a Bloom filter associated with a table column operable for various embodiments of the disclosure.

With reference to FIG. 5 a block diagram of a Bloom filter associated with a table column operable for various embodiments of the disclosure is presented. Database management system 500 is an example of database management system 300 and Bloom filter 312 of FIG. 3.

Managed object 502 represents one of the managed objects of database management system 500. In this example, the managed object is a database table, but could also be one of the other managed object types including a zone, synopsis table, a page or a region of a page. Within managed object 502 is located column 504 which may also be referred to as a portion of a managed object 510. Another example of a region or portion of a managed object with reference to a particular page would be an area of the particular page. Using this capability to distinguish regions of managed objects further enables a granular description of a region to be applied.

Range of values 506 represents the range of the current set of values maintained in column 504. Metadata 508 is descriptive information associated with column 504, for example a high value and a low value associated with range of values 506. However metadata 508 is now enhanced to further include metadata representative of a data structure in the form of Bloom filter 512.

Figure 6:
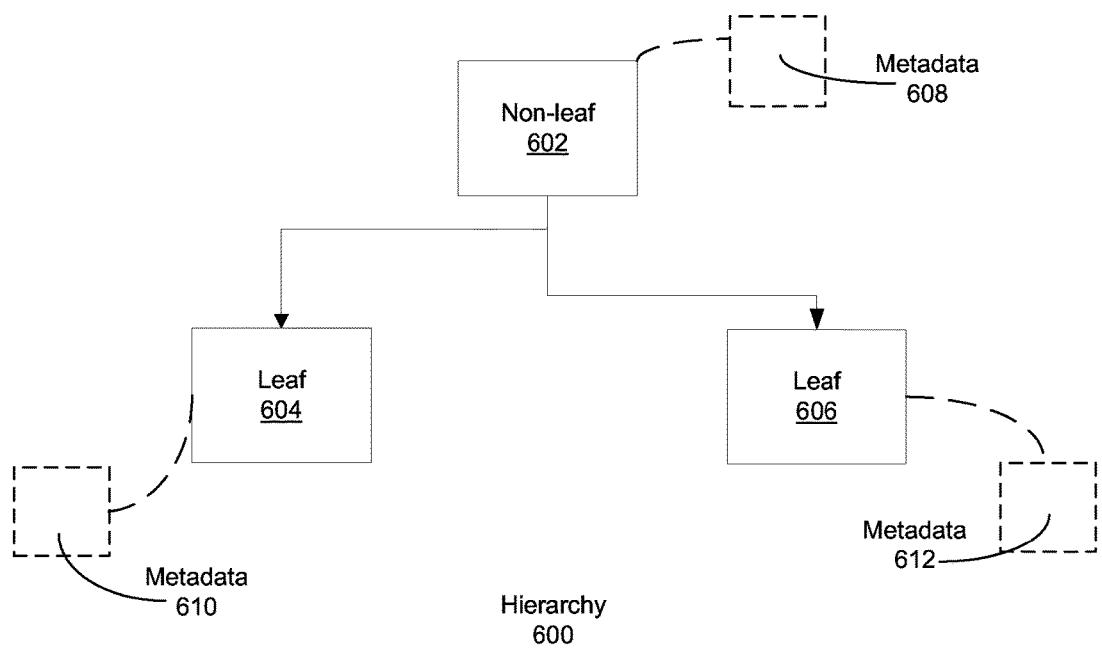
FIG. 6 is a block diagram of a hierarchical data structure including a Bloom filter operable for various embodiments of the disclosure.

With reference to FIG. 6 a block diagram of a hierarchical data structure including a Bloom filter operable for various embodiments of the disclosure is presented. Hierarchy 600 is a hierarchical data structure example of set of managed objects within a variant of database management system 300 and Bloom filter 312 of FIG. 3.

Hierarchy 600 comprises an arrangement of associated structures represented as non-leaf node 602, and first leaf node 604 and a second leaf node 606. Each of leaf node 604 and leaf node 606 is at a same level below non-leaf node 602. Non-leaf node 602 further comprises metadata 608 describing information associated with non-leaf node 602 including an instance of a Bloom filter. Leaf node 604 and leaf node 606 each further comprise metadata 610 and 612 respectively. Metadata 610 and 612 respectively describe information associated with leaf node 604 and leaf node 606.

An embodiment of the disclosed process requires creation of one or more filters prior to use in subsequent query operations. The one or more filters are created using a choice of a suitable hash function, from a set of available hash functions, for the values. The hash functions are then used to generate a filter for each object of interest or candidate, for example a zone map or a page or region of a page. When a hierarchical structure, such as hierarchy 600 is being used, the filter in metadata 608 for non-leaf node 602 is a union of all filters in metadata 610 and 612 respectively for the respective children leaf node 604 and leaf node 606.

Figure 7:
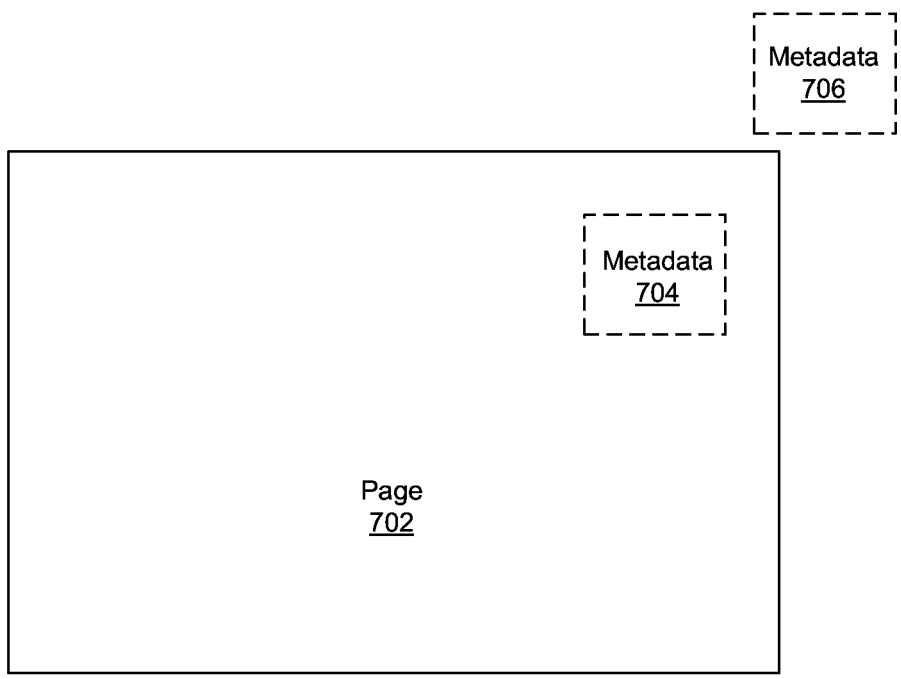
FIG. 7 is a block diagram of a flat data structure including a Bloom filter operable for various embodiments of the disclosure.

With reference to FIG. 7 a block diagram of a flat data structure including a Bloom filter operable for various embodiments of the disclosure is presented. Flat data structure 700 is an example of one of the managed objects within a variant of database management system 300 and Bloom filter 312 of FIG. 3.

Page 702 is representative of a page of data in memory as one of the types of managed objects within a variant of database management system 300 of FIG. 3. Metadata 704 and 706 respectively describe information associated with page 702. Metadata 704 is an example of on page metadata descriptive of page 702 and including an instance of a Bloom filter as described as Bloom filter 312 of FIG. 3. Metadata 706 is an example of off page metadata descriptive of page 702 and including an instance of a Bloom filter as described as Bloom filter 312 of FIG. 3. When off page metadata is used an association may be formed using logical association including tags, or direct addressing or offset addressing.

Figure 8:
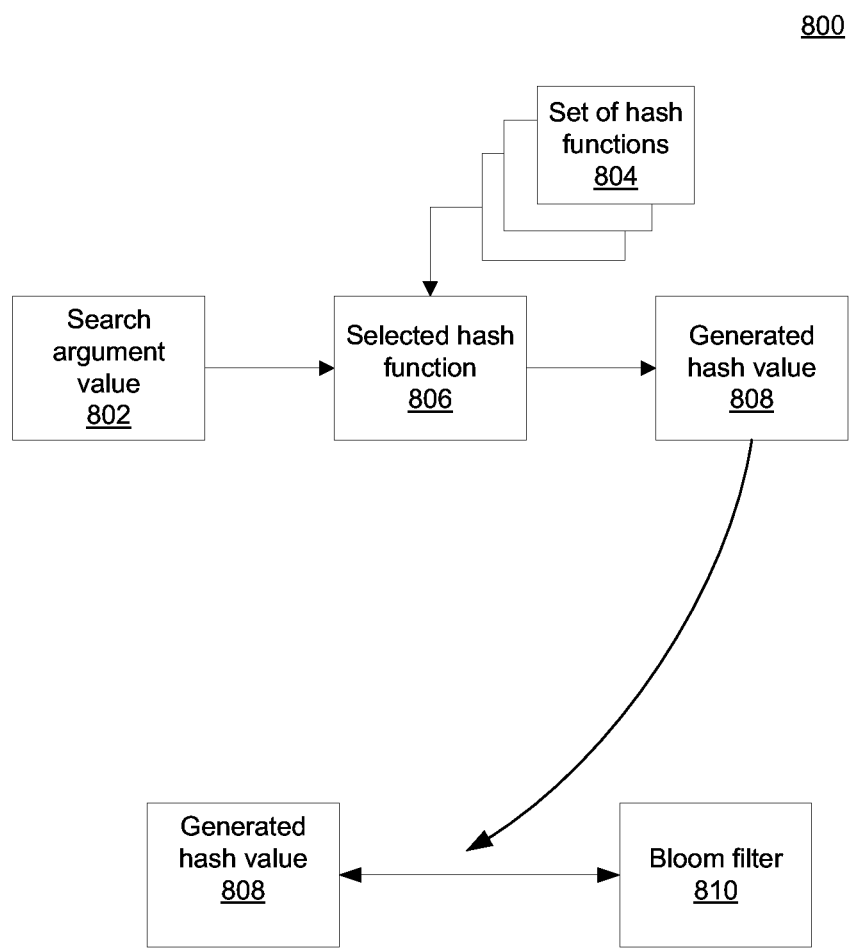
FIG. 8 is a block diagram of a set of data structures including a Bloom filter operable for various embodiments of the disclosure.

With reference to FIG. 8 a block diagram of a set of data structures including a Bloom filter operable for various embodiments of the disclosure is presented. Data structures 800 are examples of components used with managed objects within a variant of database management system 300 and Bloom filter 312 of FIG. 3.

Having created the desired Bloom filters 810 the filters are ready for use in a query operation. When using a flat zone map, first, generate a hash value 808 for each value of a search argument value 802 using a selected hash function 806 from a set of hash functions 804. Then check the generated hash value 808 for the particular query value of search argument value 802 against the Bloom filters 810 for the various candidate zones to rule out as many candidates as possible. For a hierarchical (tree-structured) zone map, the process is similar to that of the flat zone map, but the hierarchy is traversed from the top down, and for each node that cannot be ruled out, recursively checking the hashes against the filters of the respective children.

An alternative embodiment of the disclosure proposes the use of aggregated Bloom filters for each column of a particular table (as an extension of database management system 500 of FIG. 5). Using this alternative, values existing on a page or in zone, region or stride (scope of data store) for a particular column of the particular table, are hashed, and the hash value is used to set one or more bits in a Bloom filter of a particular size. The size of the Bloom filter may be as small as 8 bits (1 byte) or ranging to a size as large as 64 bits (8 bytes) or more, depending upon the values of data to be covered. Larger Bloom filters are typically limited to 1 or 2 registers on a native machine of a particular implementation.

A predicate value is first hashed and applied as a search argument to the predefined Bloom filter associated with the specific scope of data store, to determine whether the value might exist on the page or in the zone, region or stride, before decryption, decompression, or scanning of each of the columns or rows on the page, zone or region is performed to identify the actual rows that qualify the predicate. The disclosed approach typically saves large amounts of processor and potential I/O, in processing of the associated page, region or zone. To further qualify the predicate, smaller Bloom filters may be used to further segment the page, region or zone, into smaller granular segments thus enabling skipping of regions of the page, region or zone as well.

The disclosed process is designed to increase the granularity of the information that can be represented in the metadata stored in a zone map, synopsis table or on a page in a table. Typically, just the high and low values are stored as metadata. This approach is very useful for well-clustered data, and even more so when the values are fairly dense within the high/low range. The utility of the high/low values decrease as the range covered by the high/low values increases, and the density (continuity or number of sequential values) decreases. In an extreme case, there can be outlying high and/or low values that reduce the high/low values to virtually no use for pre-filtering regions of a table.

This disclosed process mitigates the previously described problem through use of a new additional piece of metadata used to encode the distinct values in a range of the table into a specific Bloom filter data structure. Bloom filters, well known in the literature, are probabilistic data structures that store an indicator (encoded in a fixed size bit map with 1 or more bits) as to whether an element is a member of a set of values summarized in the current implementation of the Bloom filter. A particular instance of a Bloom filter indicates whether a value is probably in a set of values (used to create the instance of the Bloom filter), or definitely not in the set (for zone/region of the table as in the described examples).

An implementation of the invention adds a Bloom filter to the metadata represented in managed objects of a database management system including a zone map, synopsis table, or even a page in a table. For values involved in equality predicates, the Bloom filter is tested to determine whether the region of the table has a probability of containing that value, or when used at the table page level, whether that value potentially exists on that page, before further effort is expended on decompression or decoding of the page and reading of the page.

An implementation of the invention provides an ability to more finely filter regions of a table that have metadata stored in zone maps, synopsis tables or even on a page in the table, and thus reduce processor and/or input/output resources used for a broader range of predicate application. A further optimization is provided using prefix compression to reduce the size of the Bloom filter while maintaining acceptable false positive rates.

An embodiment of the invention adds an additional metadata column to a zone map or synopsis table, or potentially on the page with the row(s), when no auxiliary metadata structure is used outside the primary data storage for the table. This new metadata column contains a Bloom filter of a varying size, depending on the density, filtering, and error rate desired in the Bloom filter, and a number of distinct values the Bloom filter represents.

Figure 9:
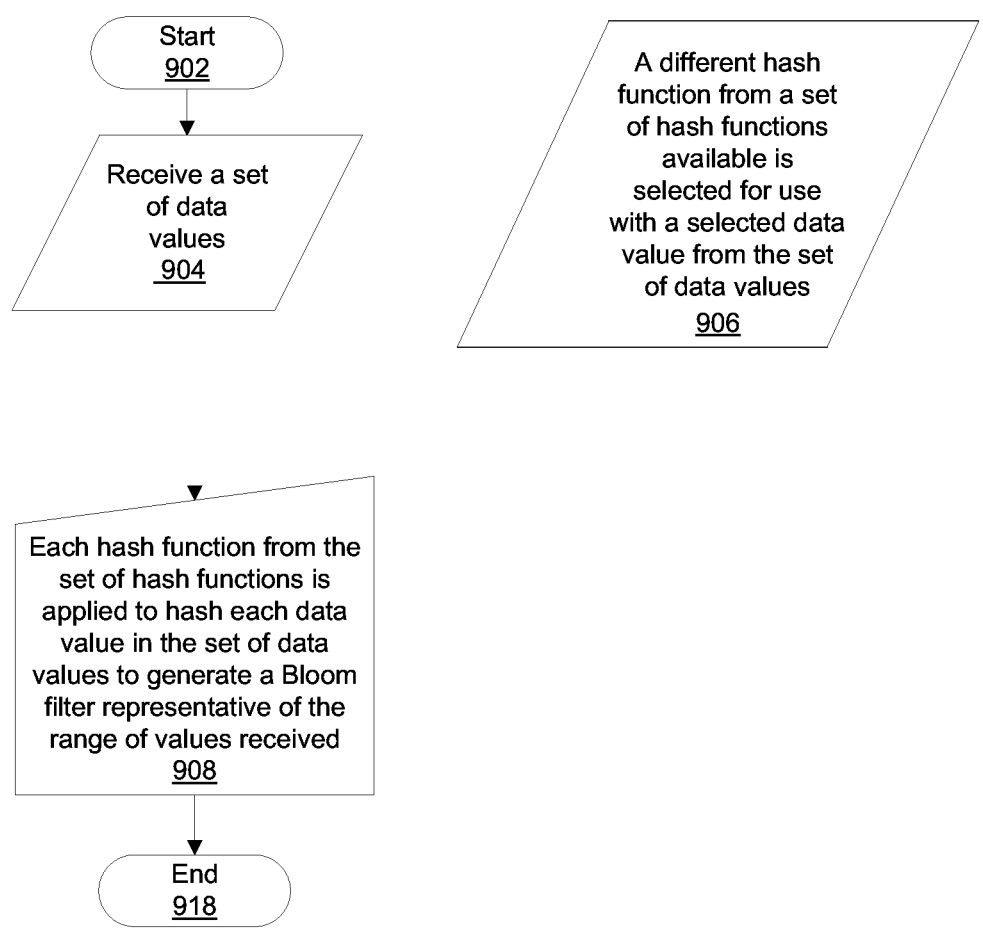
FIG. 9 is a block diagram of a Bloom filter optimization operable for various embodiments of the disclosure.

With reference to FIG. 9 a block diagram of a Bloom filter generation operable for various embodiments of the disclosure is presented. Process 900 is an example of a generation procedure used to create Bloom filter 312 of FIG. 3.

Process 900 begins (step 902) and receives a set of data values associated with a particular area of interest for a managed object of a database management system (step 904). The set of data values covers a range of values including a high value and a low value.

A set of hash functions is available for use in the generation process. A different hash function from the set of hash functions available is selected for use with a selected data value from the set of data values (step 906). Each hash function from the set of hash functions is applied to hash each data value in the set of data values to generate a Bloom filter representative of the range of values received (step 908). The Bloom filter is of a predetermined fixed length in terms of a number of bits, wherein a bit is turned on to represent a particular data value being hashed to the specific location in the Bloom filter. Process 900 ends (step 918).

Figure 10:
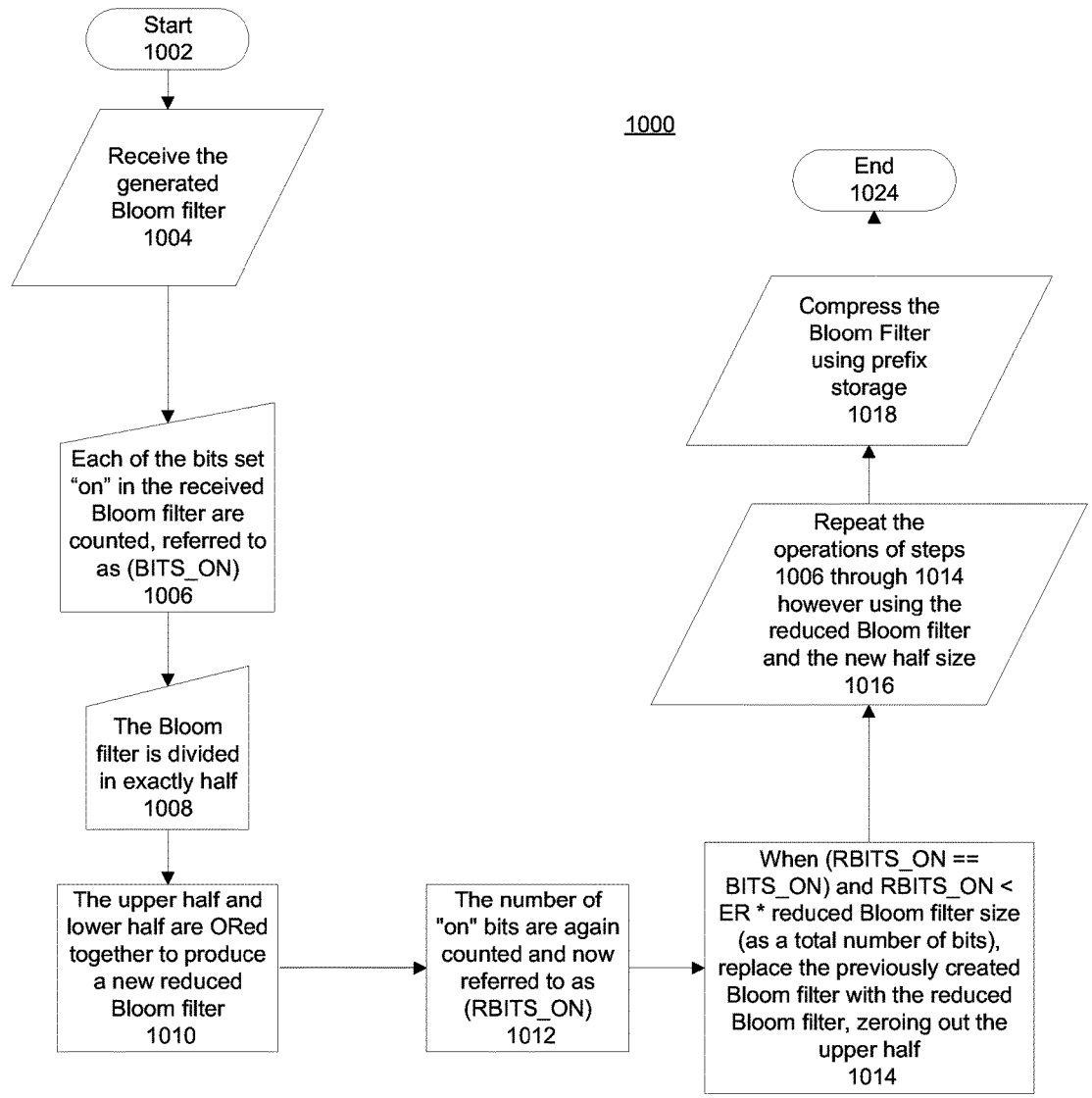
FIG. 10 is a flow chart illustrating an embodiment of the disclosure.

With reference to FIG. 10 a block diagram of a Bloom filter optimization operable for various embodiments of the invention is presented. Process 1000 is an example of an optimization procedure using Bloom filter 312 of FIG. 3.

A variable number of bits in the Bloom filter is dependent on the number of unique values to be covered in the zone/region. The Bloom filter in the example is built as a 64-bit (or potentially 128 bit) filter initially. Once built, using process 900 of FIG. 9, process 1000 is performed to reduce the size and increase the density of the previously generated Bloom filter, without significantly altering the filtering properties beginning (step 1002) with receiving the generated Bloom filter (step 1004). Each of the bits set "on" in the received Bloom filter are counted, referred to as (BITS_ON) (step 1006). The Bloom filter is divided in exactly half, (step 1008). The upper half and lower half are ORed together to produce a new reduced Bloom filter, (step 1010). The number of "on" bits are again counted and now referred to as (RBITS_ON), (step 1012).

When (RBITS_ON==BITS_ON) and RBITS_ON< 0.91*reduced Bloom filter size (as a total number of bits), replace the previously created Bloom filter with the reduced Bloom filter, zeroing out the upper half, (step 1014). In this example an error rate ER is set to a value of 0.91, however in general terms it is expressed as ER. A factor of 0.91 is chosen in the example for the error rate of the reduced Bloom filter, but other error rates could be chosen for this optimization. Repeat the operations of steps 1006 through 1014 however using the reduced Bloom filter and the new half size, (step 1016).

In an alternative embodiment, prime-sized Bloom filters may also be built. Multiple Bloom filters of different resolutions can be built and a most effective filter may be selected using projected error rates due to population density (expressed as a % of bits set to 1). For example, Bloom filter bit sizes of 7, 17, 23, 31, 47, 61, 71, 83, 97, 103, 113, 127 are possible choices as close approximations of multiples of 8-bits). The error rates can be computed using well-known formulae existing in available literature.

The variable size Bloom Filter is then compressed using prefix storage, (step 1018). The prefix (and thus a compression symbol) indicates, effectively, the size/resolution of the just compressed Bloom filter. Process 1000 then ends (step 1024).

An exception to applying the size reduction optimization would be when the Bloom filter excludes one or more of the most frequent values before size reduction optimization, but this filtering is lost after size reduction optimization. Then, when the larger Bloom filter filters a high frequency value, use of the filter could be very effective for avoiding the reading of a zone/region for a commonly used predicate value. Before reducing a Bloom Filter for a particular region, the most frequent values should be tested against the Bloom filter to determine whether the most frequent values are filtered (and accordingly indicate as definitely not in the zone), and when one or more of the frequent values are filtered by the Bloom filter, then the filter is still of use/value, and should be retained.

Additionally, Bloom filters are likely to be of little value for column that are very unlikely to use equality, or inequality predicate, such as Float values. Bloom filters are typically only of value on columns that will have equality, or equality-like predicates applied to the columns. For example, Bloom filters are useful for a wide range of common predicates including: equality (either local, or to a lesser degree join predicates); inequality predicates; "in" lists and "not-in" lists; ORed Boolean terms that are equality predicates; ORed Boolean terms against multiple columns; and ">" or, "<" for low cardinality columns with known, discrete values.

Using Bloom filters enables a reduction in the zones/ranges that need to be read from a disk or a buffer pool and processed by effectively eliminating those areas, which need not be reviewed. Use of the Bloom filters as described enables time and resource to be applied to areas likely to have the particular value being searched while ignoring areas known to not include the particular value.

The number of bits set in the Bloom filter is also an approximate indicator of the distinct values in a zone/region (a lower bound). Use of a disclosed embodiment can also be applied to a page that is compressed (as in a row store), but in this case I/O operations are not saved. However an implementation of an embodiment typically saves processor utilization required to decompress the page, which is a candidate for containing the previously mentioned predicates when the particular target value is explicitly known to not be on the page about to be searched.

An implementation of an embodiment used with pages is therefore also useful for table scans (TBSCAN), and searchable arguments as in FETCH D-SARGs. Further an implementation of an embodiment could also be used to subdivide the particular page into regions or zones, and thereby only need to decompress a subset of the page when matching rows (as determined by the Bloom filter) are not in all regions of the page, thereby reducing the resources needed to decompress a page to only that required for the subset of the page.

Logic for handling various predicate types is described in the following examples. A set of conventions is used in the examples: SynopsisBloom[i] represents the synopsis Bloom filter for the $i^{th}$ region or zone of a table, in a synopsis table, or the $i^{th}$ page or area of a page of a table when included "in-line" in the table. PredBloom is a dynamically constructed Bloom filter used for testing a Bloom filter pattern of a predicate against a Bloom filter of a synopsis table or a page.

Use of the Bloom filter to determine whether a zone or region of the table should be read, or to determine whether a page needs processing (for page-level Bloom filters) requires a Bloom filter check pattern to be constructed as described in the following examples.

When using an Equality predicate (==), a Bloom filter is constructed using a hash of the value to form a Bloom filter (PredBloom). An operation comprising a logical AND of the PredBloom with the Bloom filter of the Synopsis table is performed. A determination is made as to whether ((PredBloom & SynopsisBloom[i])==PredBloom). Scan the zone when the determination is TRUE because there is a possibility the value exists in that zone.

When using an InEquality predicate (!=), a Bloom filter is constructed using a hash of the value to form a Bloom filter (PredBloom). An operation comprising a logical AND of the PredBloom with the Bloom filter of the Synopsis table is performed. A determination is made as to whether (PredBloom & SynopsisBloom[i])!=PredBloom). When the determination is TRUE all rows are not equal and the value can be processed as needed. Because Bloom filters can return a definitive answer for "!=" predicates, the Bloom filters can be used to full qualify a zone/region.

When using IN List/ORed terms against the same column, hash the list of values/terms to construct a Bloom Filter (PredBloom). An operation comprising a logical AND of the PredBloom with the Bloom filter of the Synopsis table is performed. A determination is made as to whether ((PredBloom & SynopsisBloom[i])!=0). When the determination is TRUE, scan the zone. Note that this could be further tested to determine whether (PredBloom & SynopsisBloom[i]) has at least as many bits set as are being used in the Bloom Filter setup algorithm (often 2 bits are used per value encoded in the Bloom Filter).

Alternatively, more accuracy may be obtained by cycling through individual elements and treating the elements as equality predicates: by hashing the list of values to construct a list of Bloom filters, PredBloom[x], where x is represents a ordinal assigned to each IN list element, or each OR predicate term. An operation to OR together all of the individual PredBloom[x] terms produces a singular PredBloom. An operation comprising a logical AND of the PredBloom with the Bloom filter of the Synopsis table is performed. A determination is made as to whether ((PredBloom & SynopsisBloom[i])!=0). When the determination is TRUE, check the individual terms:

```
x=1
found = false
while    (x  <  #  of  IN/OR  terms  )
{
    if  (PredBloom[x]  &  SynopsisBloom[i]  ==  PredBloom[x])
    {
        found = true
        break;
    }
    else
    {
        x ++
    }
}
if (found == true)
{
    ...search the zone for rows that qualify the IN/OR predicate
}
```

The code snippet of the example could also be refined to construct a new sub-list of values potentially in a zone/region, and the new sub-list tested, rather than the full list.

For example, using a numeric example:

Assume C1 IN (5, 10), wherein the value 5 hashes to (00010001) and the value 10 hashes to (00100001). A data block contains values of 15 and 20, wherein the value 15 hashes to (01000100) and the value 20 hashes to (00000011), resulting in a Bloom filter comprising (01000111). The data block would not be skipped when just performing a test of "!=0." In the particular example the second test works, however with more values in use, the example typically produces more false positives.

When using ORed terms against multiple columns, for each distinct column in the OR predicate, create a PredBloom[c]. Walk through the OR predicate terms, hashing a value associated with each distinct column into an appropriate PredBloom[c]. Alternatively, a PredBloom[c] could be created for each individual value applied against a particular column, as with the alternative described previously, or IN/OR against the same column, thus creating PredBloom[c][x], and the summary PredBloom[c], consisting of all of the PredBloom[c][x] for all values of x for each value of c.

A logical AND of the PredBloom[c] against the appropriate column's synopsisBloom[c][i] is performed, as well as scanning of any zone/range that qualifies. It is possible to filter/reduce the OR terms that need to be applied to a zone/region, using the values potentially existing in that zone/region, using one of PredBloom[c]& synopsisBloom[c]!=0 or PredBloom[c]& synopsisBloom[c][i]!=synopsisBloom[c][i]. If a particular combination returns FALSE, then that OR term can be skipped, because no tuple in that zone/region qualifies that particular predicate.

When using either >, < for a low cardinality column with known, discrete values (for example, Integer columns, DEC (x, 0)), use an iterator to evaluate the values possible in a zone/region, creating a PredBloom (effectively creating an "IN List" of the qualifying values), and proceed as with the In List/OR as previously described.

Alternatively, when a small number of values are excluded by a predicate, a PredBloom of values "not" in range of interest can be constructed, and applied in the technique previously described for inequality predicates, using the methods for multiple values described above for IN Lists.

There are known ways of combining a result of multiple ANDed predicate applications, to limit the zones/regions being scanned to only zones/regions that qualify all predicates applied (for example, c1=5 and c2=9 . . . c1=5 is applied against the metadata for c1, then c2=9 is applied against the metadata for c2, the results are ANDed together, and when the value potentially exists in both metadata for a particular zone/region, the zone/region is processed/scanned, otherwise the zone/region cannot qualify, and the zone/region is skipped). This same technique can be applied to OR sub-terms that are comprised of ANDed sub-terms (e.g. (c1=5 and c2=9) or (c1=3 and c4=8)), through factoring and combining the results for the various component through appropriate AND/OR operations, to qualify a zone/region as needing to be scanned, and optionally, choosing the OR sub-terms that need to be applied to a zone/region.

When multiple Bloom filter resolutions are used, then a list of test Bloom filters can be created, and an appropriate filter chosen, using the Bloom filter resolution of the particular zone/region. This could be implemented using an array of filter values to test, with a compression prefix, or a Bloom column compression value used to apply the predicate against the Bloom filter.

For example, when prefix compression is used for a 64-bit Bloom filter column in conjunction with Bloom filters of the sizes 8, 16, 32 and 64 bits, then predicates are constructed to apply to the different prefixes, as in: [56-0 bits prefix]+8-bit PredBloom; [40-0 bits prefix]+16-bit PredBloom; [32-0 bits prefix]+32-bit PredBloom; and [0-bits prefix]+64-bit PredBloom.

It is also possible, in some cases that the entire Bloom value is very common, and the Bloom filter metadata column is dictionary encoded. In such a case, the dictionary entries could be pre-qualified as satisfying the predicate(s) in the previous examples. Thus, when a particular dictionary entry is encountered, that associated zone or region is qualified and is handled as described previously.

Thus is presented in an illustrative embodiment a computer-implemented process for an illustrative embodiment for optimizing scans using a Bloom filter synopsis. In one example, the illustrative embodiment defines metadata to encode distinct values in a range of values associated with a particular portion of a managed object in a database management system into a probabilistic data structure of a Bloom filter that stores an indicator, encoded in a fixed size bit map with one or more bits, indicating whether an element of the particular portion of the managed object is a member of a set of values summarized in the Bloom filter using a value of 1 or definitely not in the set using a value of 0. The Bloom filter is compressed to create a compressed Bloom filter. The Bloom filter is added to the metadata associated with the managed object and used when testing for values associated with predicates.

In one example an embodiment of the disclosed method wherein compressing the Bloom filter to create a compressed Bloom filter to reduce the size and increase the density of the previously generated Bloom filter, without significantly altering the filtering properties further comprises counting each bit set "on" in the Bloom filter, wherein a count is referred to as (BITS_ON); dividing Bloom filter in half to create an upper half and a lower half; performing an OR operation on the upper half and the lower half, wherein the upper half and the lower half are ORed together to produce a new reduced Bloom filter; counting each bit set "on" in the new reduced Bloom filter, wherein a next count is now referred to as (RBITS_ON); determining whether (RBITS_ON==BITS_ON) and RBITS_ON<ER*reduced Bloom filter size (as a total number of bits), wherein ER is a predetermined error rate; responsive to a determination (RBITS_ON==BITS_ON) and RBITS_ON<ER*reduced Bloom filter size, replacing the Bloom filter previously created with the reduced Bloom filter, wherein the upper half is zeroed out; iterating operations of counting, dividing, performing, counting, determining and replacing, using the reduced Bloom filter and a new half size a predetermined number of iterations; and compressing the resulting Bloom filter using prefix storage to form a compressed Bloom filter, wherein a prefix and a compression symbol indicate a size/resolution of the compressed Bloom filter.

In one example the method as previously disclosed further comprises defining metadata to encode distinct values in a range of a particular database table into a probabilistic data structure of a Bloom filter that stores an indicator, encoded in a fixed size bit map with one or more bits, indicating whether an element of the database table is a member of a set of values summarized in the Bloom filter using a value of 1 or definitely not in the set using a value of 0; adding the Bloom filter to the metadata represented in one or more of a zone map, synopsis table, or a page in the particular table, wherein when said Bloom filter is added to the metadata represented in one or more of a zone map, synopsis table, or equivalent managed database managed object: testing the Bloom filter for values involved in equality predicates, to determine whether a region of the database table has a probability of containing a particular value, prior to one or more database engine operations including fetching, decompressing, decrypting and reading of the page; and responsive to receiving a positive result from the testing, carrying out one or more database engine operations including fetching, decompressing, decrypting and reading the region of the table.

In another example the method as previously disclosed further comprises wherein when said Bloom filter is added to the database table page, testing the Bloom filter for values involved in equality predicates, to determine whether the particular value potentially exists on the database table page, prior to one or more database engine operations including decompression, decryption and reading of the page; and responsive to receiving a positive result from the testing, carrying out one or more database engine operations including decompressing, decrypting and reading the page.

In another example the method as previously disclosed further comprises using other predicate forms including lists of values and performing one of applying one of the other predicate forms in a first stage by ORing together component equality predicate Bloom tests, and applying each test individually and applying each test individually in one of after the ORed component equality predicates or without having ever applied a combined Bloom test.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for optimizing scans using a Bloom filter synopsis, the method comprising:
    defining metadata to encode distinct values in a range of values associated with a particular portion of a managed object in a database management system into a probabilistic data structure of a plurality of Bloom filters of different resolutions, where each Bloom filter stores an indicator, encoded in a fixed size bit map with one or more bits, indicating whether an element of the particular portion of the managed object is a member of a set of values summarized in the Bloom filter using a value of 1 or definitely not in the set using a value of 0;
    compressing each Bloom filter of the plurality of Bloom filters to create a plurality of compressed Bloom filters;
    testing the plurality of compressed Bloom filters to obtain a respectively corresponding plurality of projected error rates;
    selecting a selected compressed Bloom filter from the plurality of compressed Bloom filters, based, at least in part, on the plurality of projected error rates;
    adding the selected compressed Bloom filter to the metadata associated with the managed object; and
    testing the selected compressed Bloom filter for values associated with predicates.

2. The method of claim 1, wherein the testing further comprises:
    using the selected compressed Bloom filter in another managed object in the database management system wherein the particular portion of the managed object in a database management system further comprises objects associated with a particular database comprising database tables, pages, zone maps and synopsis tables and portions thereof including one or more columns of a particular database table, or one or more areas of the page, zone map or synopsis table;
    determining whether a region of a database table referenced by the another managed object has a probability of containing a particular value, prior to any further operation against the region, including fetching, decompression, decryption, and reading of the region; and responsive to receiving a positive result from the testing, carrying out one or more operations against the region, including fetching, decompressing, decrypting and reading the region.

3. The method of claim 1, wherein the testing further comprises:
   using the selected compressed Bloom filter on a database table page;
   determining whether a particular value potentially exists on the database table page, prior to any further operation against the database table page, with the further operation including: (i) decompression, (ii) decryption, and (iii) reading of the database table page; and
   responsive to receiving a positive result from the testing, carrying out one or more operations against the database table page, with the one or more operations including at least one of: (i) decompressing, (ii) decrypting and (iii) reading the database table page.

4. The method of claim 1 wherein compressing each Bloom filter of the plurality of Bloom filters to create a plurality of compressed Bloom filters further comprises:
   compressing each Bloom filter using prefix storage, wherein a prefix and a compression symbol indicate a size/resolution of the compressed Bloom filter.

5. The method of claim 1 wherein compressing each given Bloom filter of the plurality of Bloom Filters to create a plurality of compressed Bloom filters to reduce a size and increase a density of the plurality of compressed Bloom filters, without significantly altering filtering properties further comprises:
   counting each bit set "on" in the given Bloom filter, wherein a count is referred to as (BITS_ON);
   dividing the given Bloom filter in half to create an upper half and a lower half;
   performing an OR operation on the upper half and the lower half, wherein the upper half and the lower half are ORed together to produce a new reduced Bloom filter;
   counting each bit set "on" in the new reduced Bloom filter, wherein a next count is now referred to as (RBITS_ON);
   determining whether (RBITS_ON==BITS_ON) and RBITS_ON<ER*reduced Bloom filter size (as a total number of bits), wherein ER is a predetermined error rate;
   responsive to a determination (RBITS_ON==BITS_ON) and RBITS_ON<ER*reduced Bloom filter size, replacing the given Bloom filter previously created with the reduced Bloom filter, wherein the upper half is zeroed out;
   iterating operations of counting, dividing, performing, counting, determining and replacing, using the reduced Bloom filter and a new half size a predetermined number of iterations; and
   compressing the resulting Bloom filter using prefix storage to form a compressed Bloom filter, wherein a prefix and a compression symbol indicate a size/resolution of the compressed Bloom filter.

6. The method of claim 1 further comprising:
   defining metadata to encode distinct values in a range of a particular database table into a probabilistic data structure of a second plurality of Bloom filters of different resolutions, where each Bloom filter stores an indicator, encoded in a fixed size bit map with one or more bits, indicating whether an element of the particular database table is a member of a set of values summarized in the Bloom filter using a value of 1 or definitely not in the set using a value of 0;
   compressing each Bloom filter of the second plurality of Bloom filters to create a second plurality of compressed Bloom filters; and
   adding the second plurality of compressed Bloom filters to the metadata represented in one or more of a zone map, synopsis table, or a page in the particular database table, wherein when said plurality of Bloom filters is added to the metadata represented in one or more of a zone map, synopsis table, or equivalent managed database managed object:
      testing the plurality of Bloom filters for values involved in equality predicates, to determine whether a region of the database table has a probability of containing a particular value, prior to one or more database engine operations including fetching, decompressing, decrypting and reading of the page; and
      responsive to receiving a positive result from the testing, carrying out one or more database engine operations including fetching, decompressing, decrypting and reading the region of the table.

7. The method of claim 1 wherein the plurality of projected error rates are due to population density.

8. The method of claim 1 wherein the different resolutions are based, at least in part, on a number of bits equal to a plurality of prime numbers.

9. A computer program product for optimizing scans using a Bloom filter synopsis, the computer program product comprising:
   a computer recordable-type device containing computer executable program code stored thereon, the computer executable program code comprising:
      computer executable program code for defining metadata to encode distinct values in a range of values associated with a particular portion of a managed object in a database management system into a probabilistic data structure of a plurality of Bloom filters of different resolutions, where each bloom filter stores an indicator, encoded in a fixed size bit map with one or more bits, indicating whether an element of the particular portion of the managed object is a member of a set of values summarized in the Bloom filter using a value of 1 or definitely not in the set using a value of 0;
      computer executable program code for compressing each Bloom filter of the plurality of Bloom filters to create a plurality compressed Bloom filters;
      computer executable program code for testing the plurality of compressed Bloom filters to obtain a respectively corresponding plurality of projected error rates;
      computer executable program code for selecting a selected compressed Bloom filter from the plurality of compressed Bloom filters, based, at least in part, on the plurality of projected error rates;
      computer executable program code for adding the selected compressed Bloom filter to the metadata associated with the managed object; and
      computer executable program code for testing the selected compressed Bloom filter for values associated with predicates.

10. The computer program product of claim 9, wherein the computer executable program code for testing further comprises:
   Computer executable program code for using the selected compressed Bloom filter in another managed object in the database management system wherein the particular portion of the managed object in a database management system further comprises objects associated with a particular database comprising database tables, pages, zone maps and synopsis tables and portions thereof including one or more columns of a particular database table, or one or more areas of the page, zone map or synopsis table;

computer executable program code for determining whether a region of a database table referenced by the another managed object has a probability of containing a particular value, prior to any further operation against the region, including fetching, decompression, decryption, and reading of the region; and computer executable program code responsive to receiving a positive result from the testing, for carrying out one or more operations against the region, including fetching, decompressing, decrypting and reading the region.

11. The computer program product of claim 9, wherein the computer executable program code for testing further comprises:

computer executable program code for using the selected compressed Bloom filter on a database table page;

computer executable program code for determining whether a particular value potentially exists on the database table page, prior to any further operation against the database table page, including decompression, decryption, and reading of the database table page; and computer executable program code responsive to receiving a positive result from the testing, for carrying out one or more operations against the database table page, including decompressing, decrypting and reading the database table page.

12. The computer program product of claim 9, wherein the computer executable program code for compressing the plurality of Bloom filters to create a plurality of compressed Bloom filters further comprises:

computer executable program code for compressing each Bloom filter using prefix storage, wherein a prefix and a compression symbol indicate a size/resolution of the compressed Bloom filter.

13. The computer program product of claim 9, wherein the computer executable program code for compressing each given Bloom filter of the plurality Bloom filters to create a plurality of compressed Bloom filters to reduce a size and increase a density of the plurality of compressed Bloom filters, without significantly altering filtering properties further comprises:

computer executable program code for counting each bit set "on" in the given Bloom filter, wherein a count is referred to as (BITS_ON);

computer executable program code for dividing the given Bloom filter in half to create an upper half and a lower half;

computer executable program code for performing an OR operation on the upper half and the lower half, wherein the upper half and the lower half are ORed together to produce a new reduced Bloom filter;

computer executable program code for counting each bit set "on" in the new reduced Bloom filter, wherein a next count is now referred to as (RBITS_ON);

computer executable program code for determining whether (RBITS_ON==BITS_ON) and RBITS_ON< ER*reduced Bloom filter size (as a total number of bits), wherein ER is a predetermined error rate;

computer executable program code responsive to a determination (RBITS_ON==BITS_ON) and RBITS_ON< ER*reduced Bloom filter size, for replacing the given Bloom filter previously created with the reduced Bloom filter, wherein the upper half is zeroed out;

computer executable program code for iterating operations of counting, dividing, performing, counting, determining and replacing, using the reduced Bloom filter and a new half size a predetermined number of iterations; and computer executable program code for compressing the resulting Bloom filter using prefix storage to form a compressed Bloom filter, wherein a prefix and a compression symbol indicate a size/resolution of the compressed Bloom filter.

14. The computer program product of claim 9 wherein the plurality of projected error rates are due to population density.

15. The computer program product of claim 9 wherein the different resolutions are based, at least in part, on a number of bits equal to a plurality of prime numbers.

16. An apparatus for optimizing scans using a Bloom filter synopsis, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

define metadata to encode distinct values in a range of values associated with a particular portion of a managed object in a database management system into a probabilistic data structure of a plurality of Bloom filters of different resolutions, where each Bloom filter stores an indicator, encoded in a fixed size bit map with one or more bits, indicating whether an element of the particular portion of the managed object is a member of a set of values summarized in the Bloom filter using a value of 1 or definitely not in the set using a value of 0, compress each Bloom filter of the plurality of Bloom filters to create a plurality of compressed Bloom filters, test the plurality of compressed Bloom filters to obtain a respectively corresponding plurality of projected error rates, select a selected compressed Bloom filter from the plurality of compressed Bloom filters, based, at least in part, on the plurality of projected error rates, add the selected compressed Bloom filter to the metadata associated with the managed object, and test the selected compressed Bloom filter for values associated with predicates.

17. The apparatus of claim 16, wherein the plurality of projected error rates are due to population density.

18. The apparatus of claim 16, wherein the different resolutions are based, at least in part, on a number of bits equal to a plurality of prime numbers.

19. The apparatus of claim 16 wherein the processor unit executes the computer executable program code to compress the plurality of Bloom filters to create a plurality of compressed Bloom filters further directs the apparatus to:

compress each Bloom filter using prefix storage, wherein a prefix and a compression symbol indicate a size/resolution of the compressed Bloom filter.

20. The apparatus of claim 16 wherein the processor unit executes the computer executable program code to compress each given Bloom filters of the plurality of Bloom filters to create a plurality of compressed Bloom filters to reduce a size and increase a density of the plurality of compressed Bloom filters, without significantly altering filtering properties further directs the apparatus to:

count each bit set "on" in the given Bloom filter, wherein a count is referred to as (BITS_ON);

divide the given Bloom filter in half to create an upper half and a lower half;

perform an OR operation on the upper half and the lower half, wherein the upper half and the lower half are ORed together to produce a new reduced Bloom filter;

count each bit set "on" in the new reduced Bloom filter, wherein a next count is now referred to as (RBITS_ON);

determine whether (RBITS_ON==BITS_ON) and RBITS_ON<ER*reduced Bloom filter size (as a total number of bits), wherein ER is a predetermined error rate;

responsive to a determination (RBITS_ON==BITS_ON) and RBITS_ON<ER*reduced Bloom filter size, replace the given Bloom filter previously created with the reduced Bloom filter, wherein the upper half is zeroed out;

iterate operations of counting, dividing, performing, counting, determining and replacing, using the reduced Bloom filter and a new half size a predetermined number of iterations; and compress the resulting Bloom filter using prefix storage to form a compressed Bloom filter, wherein a prefix and a compression symbol indicate a size/resolution of the compressed Bloom filter.

* * * * *